(12) United States Patent
Grossman

(10) Patent No.: US 7,484,100 B1
(45) Date of Patent: Jan. 27, 2009

(54) TEMPORALLY THREADED CMI WATERMARK

(76) Inventor: David G Grossman, 1408 Bayshire La., Herndon, VA (US) 20170

( * ) Notice: Subject to any disclaimer, the term of this patent is extended or adjusted under 35 U.S.C. 154(b) by 840 days.

(21) Appl. No.: 11/081,534

(22) Filed: Mar. 17, 2005

Related U.S. Application Data

(60) Provisional application No. 60/554,407, filed on Mar. 19, 2004.

(51) Int. Cl.
  *H04L 9/00* (2006.01)
  *H04N 7/167* (2006.01)
(52) U.S. Cl. ............................ 713/176; 380/201; 726/26
(58) Field of Classification Search ................. 713/176; 705/57–59; 380/201–203, 54; 382/100; 726/26
See application file for complete search history.

(56) References Cited

U.S. PATENT DOCUMENTS 6,185,312 B1 * 2/2001 Nakamura et al. ........... 382/100
6,285,776 B1 * 9/2001 Rhoads ....................... 382/100

* cited by examiner

*Primary Examiner*—Hosuk Song
(74) *Attorney, Agent, or Firm*—David G. Grossman

(57) ABSTRACT

Disclosed is a temporally threaded copyright management information watermark where fragile watermarks containing CMI are spread throughout a digital work temporally. In one embodiment of this invention, the copyright management information is divided into a multitude of copyright management information subparts; the copyright management subparts are applied to fragile sub-watermarks; and fragile watermarks are applied to temporally separated portions of the digital work.

6 Claims, 2 Drawing Sheets

TEMPORALLY THREADED CMI WATERMARK

CROSS-REFERENCE TO RELATED APPLICATIONS

The present application claims the benefit of provisional patent application Ser. No. 60/554,407 to David G Grossman, filed on Mar. 19, 2004, which is hereby incorporated by reference.

BRIEF SUMMARY OF THE INVENTION

To achieve the foregoing and other advantages, in accordance with all of the invention as embodied and broadly described herein, is a temporally threaded copyright management information watermark comprising copyright management information. The copyright management information is divided into a multitude of copyright management information subparts. A multitude of the fragile sub-watermarks are spread across the digital work. The digital work is divided into a multitude of temporally separated portions. The multitude of fragile sub-watermarks are applied to at least two of the temporally separated portions. At least two of the fragile sub-watermarks embed at least one of the copyright management information subparts into the digital work.

A further aspect of the invention includes a computer readable medium containing a computer program that when executed by a computer applies a temporally threaded copyright management information watermark to a digital work. The program divides a digital work into temporally separated portions, divides copyright management information into copyright management information sub-parts; and then spreads the copyright management information across the digital work. The copyright management information may be spread across the digital work by applying the copyright management information subparts to fragile sub-watermarks; and then embedding the fragile sub-watermarks in the temporally separated portions.

In yet a further aspect of the invention, the digital work may include digital video, digital audio, digital information, or digital text.

In yet a further aspect of the invention, the temporally separated portions span the complete digital work.

In yet a further aspect of the invention, the digital work may also have additional watermarks including at least one forensic watermark.

In yet a further aspect of the invention, the copyright management information may include: a title identifying a work; other information identifying the work; information set forth on a notice of copyright; a name of the author of the work; other identifying information about the author of the work; the name of the copyright owner of the work; other identifying information about the copyright owner of the work; the name of a performer whose performance is fixed in the work; other identifying information about a performer whose performance is fixed in the work; the name of a writer, performer, or director who is credited in the work; other identifying information about, a writer, performer, or director who is credited in the work; terms and conditions for use of the work; identifying numbers referencing other copyright management information; symbols referencing other copyright management information; numbers referencing other copyright management information; or links referencing other copyright management information.

In yet a further aspect of the invention, the temporally separated portions may include: a frame; an MPEG I frame; an MPEG P frame; an MPEG B frame; a multitude of frames; a sub-frame; a distribution unit; or an audio segment.

In yet a further aspect of the invention, the fragile sub-watermarks contains a uniquely identifying symbol or code.

In yet a further aspect of the invention, the fragile sub-watermarks are created using: non-optimum motion vector technique; a minor rate control variation technique; a noise-tolerant watermark technique; a low-order bit variation in DC coefficients; a low-order bit variation in AC coefficients; or a low amplitude blurry symbols.

In yet a further aspect of the invention, the temporally threaded copyright management information watermark includes digital work, copyright management information, and multitude of sub-watermarks. the digital work has at least one substantial portion. Each substantial portion has a beginning, an end; and a multitude of portions distributed between the beginning and the end. The copyright management information includes a multitude of copyright management information sub-parts. Each of the sub-watermarks are capable of embedding copyright management information parts in the substantial portions. At least one of the sub-watermarks is a weak watermark.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
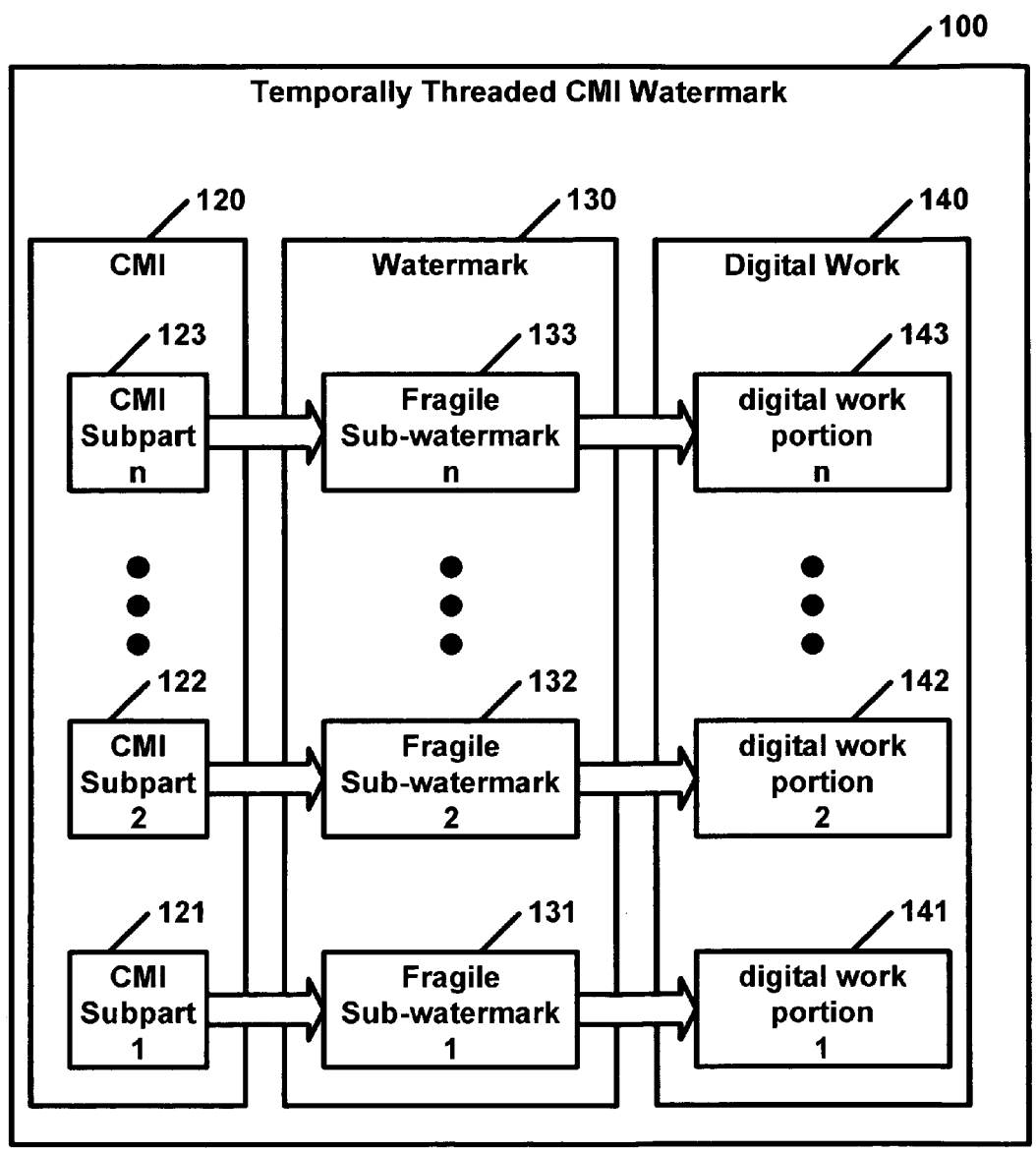
FIG. 1 shows a diagram of a temporally threaded watermark as per an aspect of the present invention.

The present invention is a temporally threaded watermark. A temporally threaded watermark is a weak watermark containing copyright management information, that is temporally threaded through digital content so that the watermark itself will likely be modified during any subsequent copying or compression processes.

Joan Van Tassel, in a white paper about digital cinema noted that "The general public wants digital information to be free, but those who create it are less sure." Piracy of movie content has been described by Jack Valenti of the Motion Picture Association of America (MPAA) as "a malignant fungus on the face of the industry." Recent research determined that industry insiders are the source of most pirated content. Much of the higher quality content pirated by insiders originates from promotional "screeners." In an attempt to stop this source of pirated content, the Motion Picture Association of America (MPAA) in 2003 attempted to ban the release of screeners. Discontent from within the industry lead to a new decision by the MPAA to allow the release of "watermarked" screeners on VHS tapes to members of the Academy of Motion Picture Arts and Sciences (the Academy). A District Court judge then lifted the ban altogether. However, most of the studios followed the MPAA decision. The following spring, when several screeners showed up on the Internet, the studios were able to determine the source of the pirated screeners due to the watermarks.

The Movie Piracy Problem

The movie industry is big business. Core copyright industries generate five percent of the United States domestic product. In 2001, American consumers spent $8.4 billion dollars to watch over 480 new releases on over 35,000 screens. Outside the United States, theatrical movie performances brought in over $11 billion. Approximately 4,000 titles have been released so far on the digital DVD format. On average, each of these movies cost over $80 million to create and market.

Jack Valenti, speaking for the movie studios has said repeatedly that "[i]f you cannot protect what you own, you don't own anything!" The industry feels besieged by content piracy. Piracy is the unauthorized use or reproduction of analog or digital copyrighted material. The movie studios allege that over $3.5 billion a year is lost to piracy of movie content on physical media such as VCR tapes and DVD's.

Before electronic home recording capabilities were available, hard distribution represented the largest source of pirating. Because of the large scale facilities required to pirate creative works, the "old fashioned copyright pirate" was easy to locate and prosecute. Modern pirates are much harder to catch because the tools of their trade include smaller relocatable devices capable of easily making large quantities of inexpensive copies. Unlike analog content that required time-consuming methods to make copies that often suffered from copy degradation, digital content today may be easily copied thousands of times without any degradation of quality.

Peer-to-peer networking over broadband is now causing an even larger problem for content owners. Digital content may now be distributed over broadband connections around the world in minutes. The government wants to promote broadband in the economic interest of the country. However, peer-to-peer networks over broadband connections allow computer users to search and download content from thousands of computers in minutes. Illegal downloading of movies in the digital format occurs 400,000 to 600,000 times a day.

The studios are concerned that inexpensive pirated content may drive out the market for legitimate content. To make things worse, high profits, due to the decreased costs of blank optical discs, are now attracting violent criminals into the piracy business.

The closely related audio entertainment industry has already suffered great business losses after failing to define and implement a secure digital audio format. Creating new technologies to reverse this trend has proven extremely difficult. However, unlike the audio entertainment industry, the video entertainment industry is still developing their high-definition video content and digital distribution standards. The video content industry is actively working towards incorporating many types of copy protection, including watermarking, into new multimedia standards. As Ronald C. Wheeler, senior vice president of content protection for Fox Entertainment Group noted, the movie industry is taking the initiative to develop anti-piracy technologies now in order to "avoid the fate of the music industry."

Many consumers have an expectation of immediate and free access to information, including creative works. Over the past several years, consumers have become quite comfortable with downloading and sharing audio files. Many consumers are now building large libraries of video content for personal use. It is natural for consumers to expect that they can make personal copies of movies in the same way. Much of the illegal copying activity demonstrates the desire of consumers for access to inexpensive digital content.

Content owners want reasonable compensation for their creative efforts. The studios use of carefully scheduled "distribution windows" helps them obtain this compensation. Controlling pirated copies of their digital content assist them in enforcing their "distribution windows." However, most pirated copies now reach the black market within days of the theatrical release. With the help of insiders, some of these pirated copies are even making it to the black market before the theatrical release.

The movie industry is committed to pursuing a multilateral approach to protect their content including the use of judicial, legislative, educational and technological measures. They have tried multiple solutions to control their content with little success so far. Now they are working on solutions that deter the theft of screeners using watermarks and copyright law.

Copyright Laws Protect Movie Content

Piracy of authored works is not new and was noted as early as 1695 in England after a grant of an economic monopoly over printed materials to the Stationers Company lapsed. In response to this piracy problem, the English parliament passed the Statute of Anne. The founding fathers of the United States, aware of this problem, gave Congress the power "[t]o promote the progress of science and useful arts, by securing for limited times to authors and inventors the exclusive right to their respective writings and discoveries." It is interesting to note that this is the only clause in the constitution that states a reason for the power it grants. In 1790, Congress, using the English Statute of Anne as a model, gave authors rights to control their own writings with the passage of the first U.S. copyright law.

Copyright laws have been adapted several times since 1790 to protect creative works from copying due to advances in technology. In 1912, Congress expanded copyright protection to motion pictures because Congress determined that "the money invested therein is so great and the property rights so valuable." These laws now give the owners of movie content the exclusive right over their works.

In 1988, Congress gave the movie industry new tools to fight piracy when it enacted the Digital Millennium Copyright Act ("DMCA"). The Digital Millennium Copyright Act may be used against pirates who interfere with watermark implementations. This Act was passed in part to implement the World Intellectual Property Organization Copyright Treaty ("WIPO Treaty"). It recognizes "the fact that in the digital age, authors must employ protective technologies in order to prevent their works from being unlawfully copied or exploited." The purpose of the WIPO Treaty was to introduce new international copyright rules to address issues raised by "new economic, social, cultural and technological developments." Article 11 of the WIPO treaty recognizes the right of the movie industry to use technological measures to protect their content by requiring contracting members to provide legal protections and remedies against circumvention of copy protection measures (such as watermarks) used by content owners.

The DMCA was highly supported by "most large copyright holders" but opposed by many academics and open-source advocates. Hollywood successfully lobbied for very broad anti-circumvention legislation subject to specific exceptions lobbied for by Silicon Valley technology firms.

Forensically Watermarked Screeners

"Screeners" are copies of movies used to promote films. These screeners enable members of the film industry to view movies without having to go to a theater. There are two types of screeners: "promotional screeners" and "award screeners."

Promotional screeners promote retail releases of films to retailers and news organizations. "Award screeners" promote films to members of film award organizations. The Studios believes that screeners are a major source of the high quality pirated content made available before and during a movies' early release window.

Content owners, when they recognize that a new technology poses a piracy threat to their content, often threaten to withhold new content from the technology unless methods of copy protection directed towards the new technology are developed and deployed. Because new technologies were making it too easy to copy and distribute the screeners, studios cut back on the use of "promotional screeners". However, the industry seems unwilling to stop using "awards screeners" because they are too important to the financial success of a film. When the MPAA tried to ban screeners in the fall of 2003, a group of independent filmmakers successfully fought off the ban. The MPAA admitted that because of the importance of screeners to the success of a film, it is likely that its own members would have eventually broken the ban.

On Oct. 23, 2003, the MPAA announced that they were reinstituting awards screeners. The awards screeners were only released in videocassette format to Academy members. Each Academy member had to sign a contract that they would take full responsibility for their screener. The punishment for allowing a screener to be pirated would include "immediate expulsion" from the Academy. Many of the screeners included individualized forensic watermarks. Watermarks are imperceptible data embedded in content. Removing a good forensic watermark significantly degrades the quality of the copy, thus destroying the economic value of the copy. With forensic watermarks, the imperceptible data contains information for tracing to the source of unauthorized copying of content. An example of a technology that can be used to generate a forensic watermark may be found in U.S. Pat. No. 6,285,774, entitled "System and Methodology for Tracing to a Source of Unauthorized Copying of Prerecorded Proprietary Material, such as Movies," issued Sep. 4, 2001 to Iu et al.

Forensically watermarking the screeners worked. In January of 2004, pirated screeners started showing up on the Internet. With the help of the forensic watermarks, the sources of several pirated copies were determined. Authorities charged several pirates criminally and at least one Academy member has been expelled. In addition, some of the studios have filed civil lawsuits against the pirates.

It is likely that consumers will accept forensic watermarks because they are a simple-to-use technology that is capable of providing unobtrusive copyright protection. Forensic watermarks do not create additional burdens on the consumer such as having to buy new compliant equipment to use the content. In addition, forensic watermarks are likely to have a large deterrent effect when implemented with an active program of public criminal and civil prosecution of pirates.

Watermarks and Fair Use

The VCR was one of the first consumer products developed by the technology industry that enabled consumers to copy and share movie content. Concerned about the piracy of movie content that this new technology would lead to, owners of movie content sued VCR manufacturer Sony Corporation for copyright infringement. The studios were concerned that this technology would enable millions of users to copy their content, causing them great harm. However, the Supreme Court, in a 5-4 decision, held that the VCR's main use, home-use recording, is not a copyright infringement. A key factor in the Sony decision was the consumers right to "fair use" of content.

Fair use is an important judicial doctrine that limits the exclusive right of copyright owners. Because forensic watermarks do not limit access to content, fair use does not become an issue. However, there is another type of watermark that the film industry may want to use in its battle against piracy called a copy control watermark. Copy control watermarks contain information that controls access to content by only allowing the content to be used with compliant hardware and permission of the right holder. Because this type of watermark is effective only on compliant products, it would likely require an act of Congress to enforce. Unfortunately, systems that utilize copy control watermarks can prevent people who could normally exert a fair use defense from gaining access to content.

Today the law seems to favor copy protection over fair use. Since the Sony decision, Congress has mandated in the Digital Millennium Copyright Act that all VCRs include copy-protection hardware that could arguably affect fair use.

Circumvention of Copy Control Watermarks

Screeners that utilize forensic watermarks do not limit access to content. It would increase the legal power of the marks if these "forensic" watermarks could be made into copy control watermarks by adding a legitimate copy control function to the watermarks for the purpose of protecting pre-release movie content. Then, legal protections afforded by the anti-circumvention clause of the DMCA could be brought into play. The movie industry has been experimenting with limited access systems to protect distribution of daily shootings during movie production. A single watermark that provides both forensic and copy-control functions could be implemented for the legitimate purpose of tracing and limiting access to content from daily shootings and throughout all of the pre-release production process. Then this same watermark could be used as a forensic watermark to trace copies of content after distribution. Because these watermarks would only be used for forensic purposes after distribution, they would not affect later fair uses of the content.

Circumventing copy control watermarks is actionable under 17 U.S.C. § 1201 of the DMCA, which addresses circumvention of technological copy protection measures. This anti-circumvention clause provides that "no person shall circumvent a technological measure that effectively controls access to a work protected under [Title 17]." Circumventing a technological measure includes avoiding, bypassing, removing, deactivating, or otherwise impairing a technological measure "without the authority of the copyright owner." This clause also makes trafficking in products that circumvent technological copy protection measures illegal. Even though these anti-circumvention prohibitions were enacted "[a]s part of the balance Congress sought to strike in protecting the rights of copyright owners while preserving fair use," they are broader than the WIPO Treaty requires.

17 U.S.C. § 1201 is written to enforce the right of a copyright holder to protect their content using technology such as copy control watermarks in several ways. Anyone who enables a pirate by providing them with tools to defeat copy control watermarks violates sections 1201(a)(2) and 1201(b)(1). Specifically, section 1201(a)(2) will apply when a copy control watermark is designed to prevent access to copyrighted movie content. Subsection 1201(b)(1) will apply when the copy control watermark is designed to prevent copying of copyrighted movie content. Civil and criminal penalties are provided for violating these anti-trafficking provisions. In addition, when a pirate uses technologies to circumvent copy control watermarks, she will be violating subsection 1201(a)(1).

Copy Management Information and (CMI) Watermarks

One of the advantages of the forensic watermarks used in the screeners is that they helped pinpoint the pirates by including identifying information in the watermark that when extracted from the pirated copy, helped pinpoint the source of the copy. Section 1202 of the DMCA makes modifying Copyright Management Information (CMI) actionable. Section 1202(b)(1) makes it illegal to "intentionally remove or alter any copyright management information" . . . "without the authority of the copyright owner or the law." In addition, section 1202(b)(3) makes it illegal to distribute "copies of works . . . knowing that the copyright management information has been removed or altered without authority of the copyright owner."

A watermark must include some digital identifying information to qualify as a CMI under section 1202. The identifying information may include information about a work such as the title, author(s), owner(s), performer(s), writer(s), director(s), identifying number(s), or other identifying information. This information may be included indirectly through a link. The forensic watermark may even include "[t]erms and conditions of use" for the work. Terms and conditions could include machine-readable signals only. Alterations or removal of any of the CMI information, human readable or not, could be used for evidentiary purposes.

Forensic watermarks as used in screeners may not qualify as a CMI under section 1202 because they include an identifier that links the screener to a user. Because of privacy concerns, Congress never intended that a CMI include tracking or usage data. CMIs explicitly state that they may not include "any personally identifying information about a user of a work or of a copy . . . of a work." Arguably, it appears that the studios could not invoke section 1202 to enforce the modification or removal of forensic watermarks containing tracking information in screeners. However, the studios could use a separate CMI watermark that contains CMI information without any forensic tracking information.

Section 1202 only protects CMI watermarks for the information they contain, not the watermarking technique that contains the information. If a content owner wants to use section 1202 as a legal stick against a pirate, the content owner could use a CMI watermark that a pirate would want to (and could) modify or remove. One way to do that would be to embed a visible and/or weak watermark in screener content that a pirate would want to remove.

The present invention, a temporally threaded CMI watermark, is as another option to protect movie content. A temporally threaded CMI watermark spreads a watermark containing copy management information throughout a substantial section of digital movie content temporally. The substantial section could involve a critical scene or a complete movie from the beginning to the end. Once the substantial section of the movie content is watermarked with a temporally threaded CMI watermark, it will be wrapped with section 1202 copy protection. Then, whenever a pirate edits or compresses the substantial section of the movie, the temporally threaded CMI watermark will be "modified" and the pirates' actions will have violated section 1202 of the DMCA. This type of watermark is consumer friendly, because it does not create a burden on the consumer or preemptively affect fair use of the content.

Figure 2:
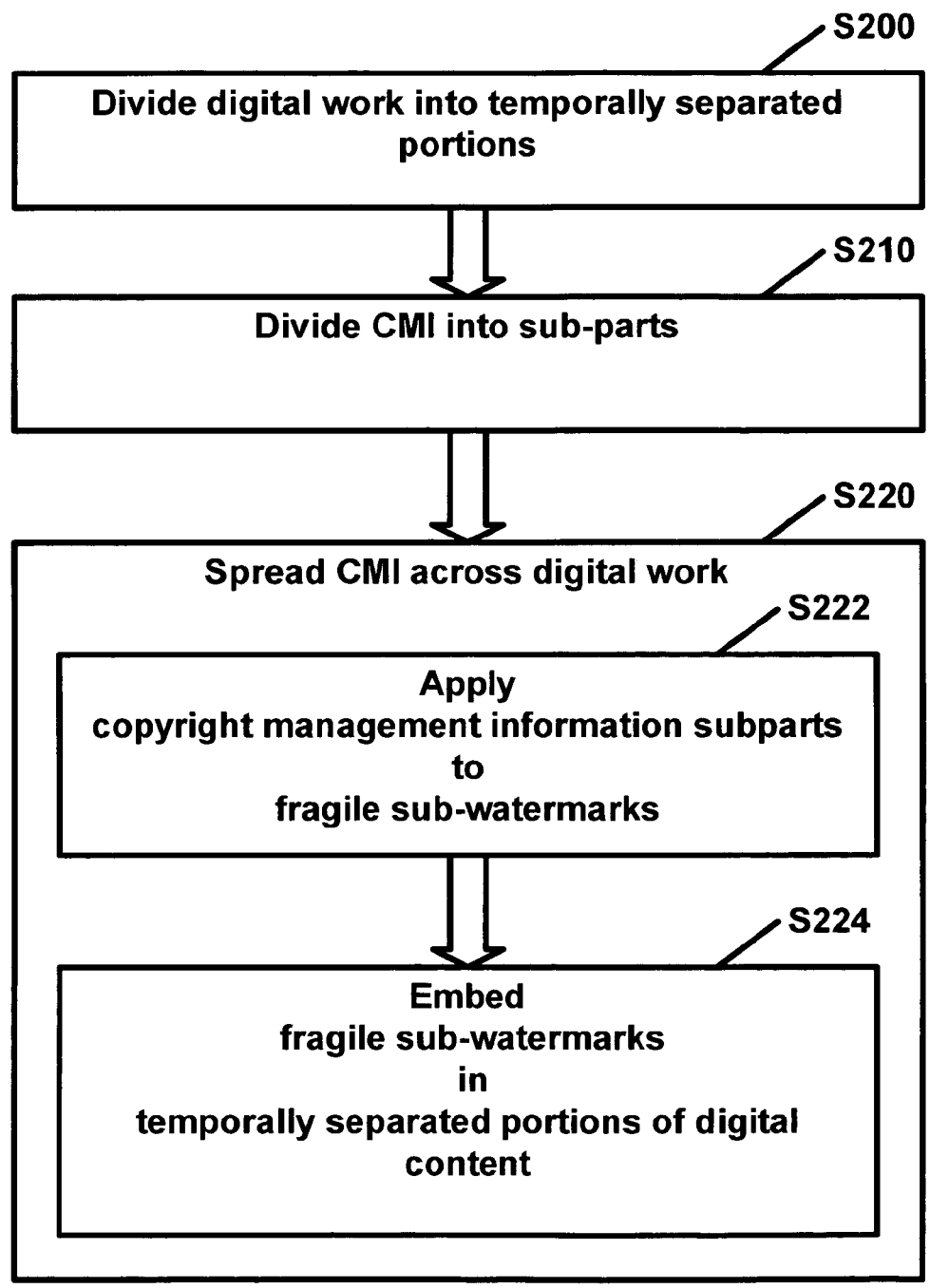
FIG. 2 is a flow diagram of a method of applying a temporally threaded watermark as per an aspect of the present invention.

Broadly speaking, the present invention involves one or more fragile (or weak) watermarks containing CMI that is spread throughout a digital work temporally. One skilled in the art will recognize that there are many ways to practice this invention. FIGS. 1 and 2 show two such possible embodiments.

FIG. 1 shows a diagram of a temporally threaded copyright management information watermark 100 as per an aspect of the present invention. Copyright management information 120 is preferably broken into multiple subparts (121, 122, . . . 123). The copyright management information 120 may include information such as the title identifying the digital work; other information identifying the digital work; information set forth on a notice of copyright; a name of an author of the work; other identifying information about an author of the work; the name of a copyright owner of the work; other identifying information about a copyright owner of the work; the name of a performer whose performance is fixed in the work; other identifying information about a performer whose performance is fixed in the work; the name of a writer, performer, or director who is credited in the work; other identifying information about, a writer, performer, or director who is credited in the work; terms and conditions for use of the work; identifying numbers referencing other copyright management information; symbols referencing other copyright management information; numbers referencing other copyright management information; and links referencing other copyright management information. Generally, the more subparts the better. Each of the distinct pieces of information in the CMI 120 may also be subdivided to ultimately be spread through the digital work.

The CMI 120 is then preferably incorporated into a watermark 130. The desired effect of spreading the CMI 120 through digital content 140 may be achieved by incorporating CMI subparts (121, 122, . . . 123) into fragile sub-watermarks (131, 132, . . . 133), which are then applied to portions of the digital work (141, 142, . . . 143). It is possible that more than one CMI subpart (121, 122, . . . 123) may be applied to any particular fragile sub-watermark (131, 132, . . . 133), and that more than one sub-watermark (131, 132, . . . 133) may be applied to any particular portion of the digital work (141, 142, . . . 143). It is also possible that one CMI subpart (121, 122, . . . 123) may be applied to more than one fragile sub-watermark (131, 132, . . . 133), and that one sub-watermark (131, 132, . . . 133) may be applied to more than one portion of the digital work (141, 142, . . . 143). One or more subparts of the CMI (121, 122, . . . 123), sub-watermarks (131, 132, . . . 133) or digital portions (141, 142, . . . 143) may be void.

The sub-watermarks (131, 132, . . . 133) may include any type of watermarking technique known in the art including visible and invisible marks. However, unlike the basic teachings in the art that a watermark should be strong, it is highly preferable that these watermarks be as fragile as possible. Therefore, editing, compression, etc. will have the effect of modifying the watermark. Examples of watermarking techniques include but are not limited to watermarks created using non-optimum motion vector techniques, minor rate control variation techniques, noise-tolerant watermark techniques, low-order bit variation in AC or DC coefficients, and low amplitude blurry symbols.

The collection of digital work portions (141, 142, . . . 143) may include a part of the digital work 140, a substantial portion of the digital work 140, or the whole of the digital work 140. The more of the digital work 140 that is covered, the better. At least several of the digital work portions (141, 142, . . . 143) should be temporally separated when the digital work 140 is viewed as a whole. Examples of these digital work portions (141, 142, . . . 143) include but are not limited to frames, MPEG I frame(s); MPEG P frame(s), MPEG B frame(s), multitudes of frames, sub-frame(s), distribution unit(s), and audio segment(s).

Although the CMI subparts (121, 122, . . . 123), fragile sub-watermarks (131, 132, . . . 133), and digital work portions (141, 142, . . . 143) have so far been described in discrete terms, it is envisioned that all or part of them may be continuous in nature. In this case the CMI information 120 may be spread through the digital work 140 using continuous spread spectrum techniques.

FIG. 2 is a flow diagram of a method of applying a temporally threaded copyright management information watermark as per an aspect of the present invention. As shown, at step S200 a digital work may be divided into temporally separated portions. Then, at step S210, CMI may be divided into subparts. Next, at step S220, the CMI may be spread across the digital work. This application of the CMI to the digital work may be performed by applying CMI subparts to fragile watermarks at step S222 which may then be embedded into temporally separated portions of the digital content at step S224. Variations of this technique may be performed such as using a sub-watermark that can spread CMI (or portions thereof) over large portions (or all) of the digital work using spread spectrum techniques.

Layering Protection

There is no requirement that a watermark be exclusive to an individual piece of content. One option that the studios could use to add teeth to their watermarking would be to embed multiple watermarks in their content. A first hard to break forensic watermark could include tracing information, thus keeping it from qualifying as a CMI under section 1201. However, a second watermark could be a CMI watermark. A third watermark could be copy control watermark. If a pirate were to modify or remove the second watermark, the pirate would be guilty of violating section 1202. If the pirate circumvents the copy control watermark, the pirate would be guilty of violating section 1201. However, the CMI watermark, which may not be actionable by either section 1201 or 1202 could be used to identify the source of the pirated content. Although the forensic and CMI watermarks should not be combined, there is no good reason not to combine forensic and copy control watermarks.

Other Enforcement Mechanisms

The No Electronic Theft Act ("NET") provides for criminal remedies against consumers who trade economically valuable files (such as movie files) electronically. Congress passed the NET Act after a Federal Court in Massachusetts held that an individual could not be prosecuted for posting copyrighted software on a publicly accessible computer bulletin board. The intent of this act is to make people who intentionally distribute copyrighted content (including pirated movie content), but don't profit from their distribution, criminally liable.

At first glance, it appears that evidence collected using forensic watermarks would be useful to the movie studios in their copyright infringement battle to prosecute pirates using the No Electronic Theft Act ("NET"). However, the NET act specifically states "evidence of reproduction or distribution of a copyrighted work, by itself, shall not be sufficient to establish willful infringement." Therefore, it appears that although watermarks may be capable of identifying the source of unauthorized reproduction and distribution of copyrighted materials, additional evidence will be required in a successful prosecution to prove that the unauthorized actions were willful.

Contract law restrictions, combined with technological measures, provide studios great flexibility in controlling content. The studios are now requiring recipients of screeners to sign contracts agreeing to not distribute their copies of the screeners. Movie copyright owners have used contract law in the past to regulate the distribution and use of their content. Now with the addition of forensic watermarks embedded in each screener, the studios have the technology to prove in civil court when a recipient has broken a contract provision by distributing a copy of a screener.

Watermarks can be effective to assist the goals of two bills introduced into Congress. The ACCOPS Act purports to increase domestic and international copyright enforcement for copyrighted material distributed over public computer networks. The Art Act applies civil and criminal penalties specifically for unauthorized distribution of prerelease movie content such as screeners. In both of these cases, watermarks can be useful to locate and collect evidence around illegal pirating of screeners.

CONCLUSION

The movie industry has a problem of pre-release movie content being pirated. The economic effect of this piracy significantly impacts a large segment of the United States economy. Watermarks, a technological solution to the problem of pirated pre-release content and screeners, may be used in multiple ways to protect this movie content. Most watermarks are either copy control or forensic watermarks. Forensic watermarking focuses more on holding pirates accountable than restricting content usage. The main power behind forensic watermarks is deterrence. These watermarks enable copyright owners to identify illegally copies of their content once they reach publicly available forums such as the Internet. Copy control watermarks, to be consumer friendly, are best utilized to prevent unauthorized access of content within the industry before distribution to the home market. The present invention, a temporally threaded CMI watermark(s), wraps DMCA section 1202 protection around a copyrighted work. In addition, it is an aspect of the present invention that temporally threaded CMI watermarks be combined with other copy control and forensic watermarks. Using theses watermarks as evidence, the sources of the illegally copied screeners may be publicly admonished creating a powerful deferent. Collectively, these watermark technologies can provide both the movie industry and other types of digital content owners powerful legal and technological tools to protect their content against the pirates without affecting fair use.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. Although parts of the disclosure described the claimed invention being used in conjunction with digital movie content, one skilled in the art will recognize that the claimed invention is in fact much broader. For example, the temporally threaded CMI watermarks may be used to protect any type of digital content including music, software programs, and audio. Similarly, it is envisioned that many types of watermarking techniques known in the art may be applied to creating a temporally threaded CMI watermark. One key characteristic of watermarking techniques utilized in the practicing the present invention is that the watermarks be capable of being spread temporally throughout digital content. An additional important characteristic of watermarking techniques utilized in the practicing the present invention is that (counter to the literatures teachings that watermarks be strong) the watermarks be weak (i.e. fragile or easily breakable).

What is claimed is:

1. A computer readable medium containing at least one sequence of executable instructions, wherein execution of said "executable instructions" by one or more processors causes said "one or more processors" to apply a temporally threaded copyright management information watermark to a digital work by:
   a) dividing said "digital work" into a multitude of temporally separated portions;
   b) dividing copyright management information into a multitude of copyright management information sub-parts; and
   c) spreading said "copyright management information" across said "digital work" by at least twice:
      i) applying at least one of said "multitude of copyright management information subparts" to at least one of a multitude of fragile sub-watermarks;
      ii) embedding said "at least one of a multitude of fragile sub-watermarks" in at least one of said "multitude of temporally separated portions."

2. A computer readable medium according to claim 1, wherein said digital work is one of the following:
   a) digital video;
   b) digital audio;
   c) digital information; and
   d) digital text.

3. A computer readable medium according to claim 1, wherein said "multitude of temporally separated portions" spans the complete said "digital work."

4. A computer readable medium according to claim 1, wherein said "copyright management information" includes at least one of the following:
   a) a title identifying said "digital work;"
   b) other information identifying said "digital work;"
   c) information set forth on a notice of copyright;
   d) a name of an author of said "digital work;"
   e) other identifying information about an author of said "digital work;"
   f) the name of a copyright owner of said "digital work;"
   g) other identifying information about a copyright owner of said "digital work;"
   h) the name of a performer whose performance is fixed in said "digital work;"
   i) other identifying information about, a performer whose performance is fixed in said "digital work;"
   j) the name of a writer, performer, or director who is credited in the work;
   k) other identifying information about, a writer, performer, or director who is credited in said "digital work;"
   l) terms and conditions for use of said "digital work;"
   m) identifying numbers referencing other copyright management information;
   n) symbols referencing other copyright management information;
   o) numbers referencing other copyright management information; and
   p) links referencing other copyright management information.

5. A computer readable medium according to claim 1, wherein at least one of said "multitude of temporally separated portions" includes at least one of the following:
   a) a frame;
   b) an MPEG I frame;
   c) an MPEG P frame;
   d) an MPEG B frame;
   e) a multitude of frames;
   f) a sub-frame;
   g) a distribution unit; and
   h) an audio segment.

6. A computer readable medium according to claim 1, wherein said "digital work" also has at least one forensic watermark.

* * * * *